United States Patent
McConnell et al.

(10) Patent No.: US 7,346,626 B2
(45) Date of Patent: *Mar. 18, 2008

(54) CONNECTING TO A SET OF PHRASES JOINING MULTIPLE SCHEMAS

(75) Inventors: Christopher Clayton McConnell, Redmond, WA (US); David Dawson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

This patent is subject to a terminal disclaimer.

(21) Appl. No.: 11/265,682

(22) Filed: Nov. 2, 2005

(65) Prior Publication Data

US 2006/0059150 A1    Mar. 16, 2006

Related U.S. Application Data

(63) Continuation of application No. 10/184,775, filed on Jun. 30, 2002, now Pat. No. 7,043,498.

(51) Int. Cl.
*G06F 17/30* (2006.01)
(52) U.S. Cl. .......................... 707/102; 707/3; 707/100
(58) Field of Classification Search ................ 707/100, 707/102, 3, 6, 7
See application file for complete search history.

(56) References Cited

U.S. PATENT DOCUMENTS

| | | | |
|---|---|---|---|
| 5,806,066 A | | 9/1998 | Golshani et al. ............ 707/100 |
| 5,845,273 A | * | 12/1998 | Jindal ............................ 707/1 |
| 6,684,221 B1 | | 1/2004 | Rejndrup .................. 707/104.1 |
| 6,718,320 B1 | | 4/2004 | Subramanian et al. ......... 707/2 |
| 6,785,689 B1 | | 8/2004 | Daniel et al. ................ 707/102 |
| 2002/0188694 A1 | | 12/2002 | Yu .............................. 709/218 |
| 2003/0217069 A1 | | 11/2003 | Fagin et al. ................. 707/102 |

* cited by examiner

*Primary Examiner*—Apu Mofiz
*Assistant Examiner*—Cam Linh Nguyen
(74) *Attorney, Agent, or Firm*—Woodcock Washburn LLP

(57) ABSTRACT

A system and method for connecting to a set of phrases joining multiple schemas is disclosed. A phrase identifying particular content corresponding to a particular schema is submitted by an affiliated data provider to a portal. The portal matches the phrase to a set identifying particular content corresponding to multiple schemas. The portal may match the phrase to the same set as another phrase identifying the particular content in the particular schema. The portal may match the phrase to a set in a particular group of sets identifying content across common schemas. The portal may match the phrase to a set in the same group as another phrase identifying content in the particular schema. The portal may match the phrase to a previously established set or to a newly established set.

3 Claims, 6 Drawing Sheets

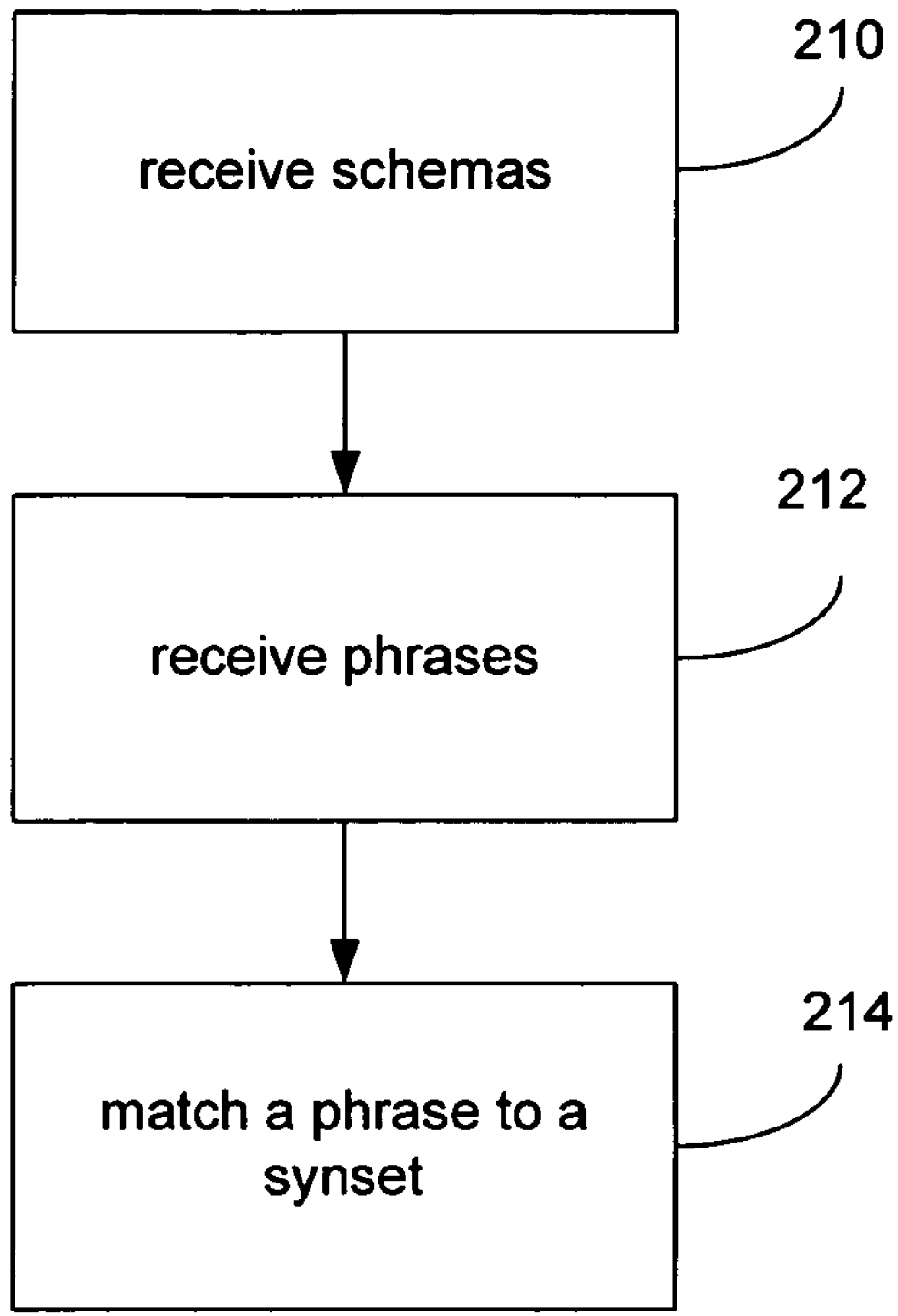

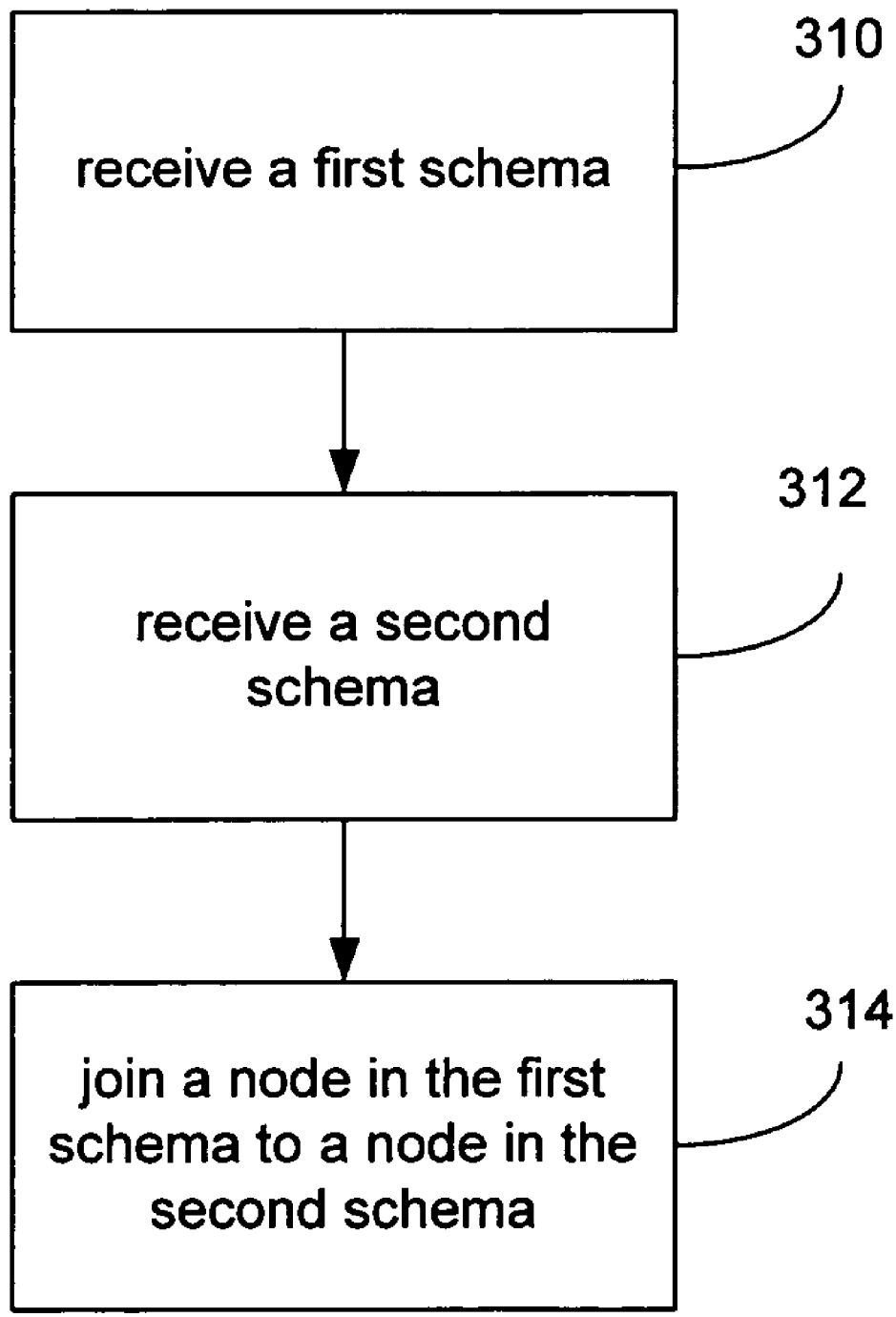

CONNECTING TO A SET OF PHRASES JOINING MULTIPLE SCHEMAS

REFERENCE TO RELATED APPLICATIONS

This is a continuation of application Ser. No. 10/184,775, filed Jun. 30, 2002 now U.S. Pat. No. 7,043,498.

FIELD OF THE INVENTION

This invention relates in general to the field of information retrieval. More particularly, this invention relates to connecting to a set of phrases joining multiple schemas.

BACKGROUND OF THE INVENTION

Internet portals and search engines, such as MSN®, serve as gateways to Internet users by accumulating and categorizing information, and providing a wide array of services. A portal may perform a search based on a query entered by a visitor to the portal. In an existing method for performing a search, affiliated data providers submit data to be searched directly to the portal. The data may be imported into the portal's database management system. In this existing method, the portals may regularly receive data from hundreds of providers. Each data provider may submit a provider data file including multiple schemas.

In addition to a submitting multiple schemas, each data provider may submit corresponding files of phrases. A phrase is a word or words identifying specific content corresponding to a particular node in a schema. For example, a particular data provider may have data about flights departing from Chicago. The provider may have a flight schema with a departure node indicating the city from which a flight departs. "Chicago" may be content corresponding to the departure node. The content "Chicago" may be identified by the phrases "Chicago", "Windy City", and "Cook County".

Another data provider may have data about limousine services available in New York City. The provider may have a limousine schema with a location node indicating the city in which the limousine service is available. "Chicago" may be content corresponding to the location node. The provider may submit a file of phrases identifying the content "Chicago."

In existing methods for performing a search, words in a query are matched to phrases submitted by each individual data provider identifying particular content in a particular schema. The efficiency of a search is greatly improved if, rather than matching words in a query to phrases submitted by each provider, words in a query are matched to a single phrase identifying particular content across multiple provider schemas. Such a single phrase identifying content across multiple provider schemas may be referred to as a "synset." Phrases from individual providers must be matched to the synset.

SUMMARY OF THE INVENTION

A system and method for connecting to a set of phrases joining multiple schemas is disclosed. A phrase identifying particular content corresponding to a particular schema is submitted by an affiliated data provider to a portal. The portal matches the phrase to a set identifying particular content corresponding to multiple schemas.

The portal may match the phrase to the same set as another phrase identifying the particular content in the particular schema. The portal may match the phrase to a set in a particular group of sets identifying content across common schemas. The portal may match the phrase to a set in the same group as another phrase identifying content in the particular schema. The portal may match the phrase to a previously established set or to a newly established set.

In one embodiment of the invention, the portal receives from a first affiliated data provider a first schema including multiple nodes. The portal receives from a second affiliated data provider a second schema including multiple nodes. At query time, the portal joins a node in the first schema to a node in the second schema whereby a phrase identifying particular content corresponding to the node in the first schema also identifies particular content corresponding to the node in the second schema.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2 is a flowchart of a method connecting to a set of phrases joining multiple schemas in accordance with an aspect of the present invention;

FIG. 3 is a flowchart of a method for joining multiple schemas in accordance with an aspect of the present invention;

DETAILED DESCRIPTION OF PREFERRED EMBODIMENTS

Figure 1:
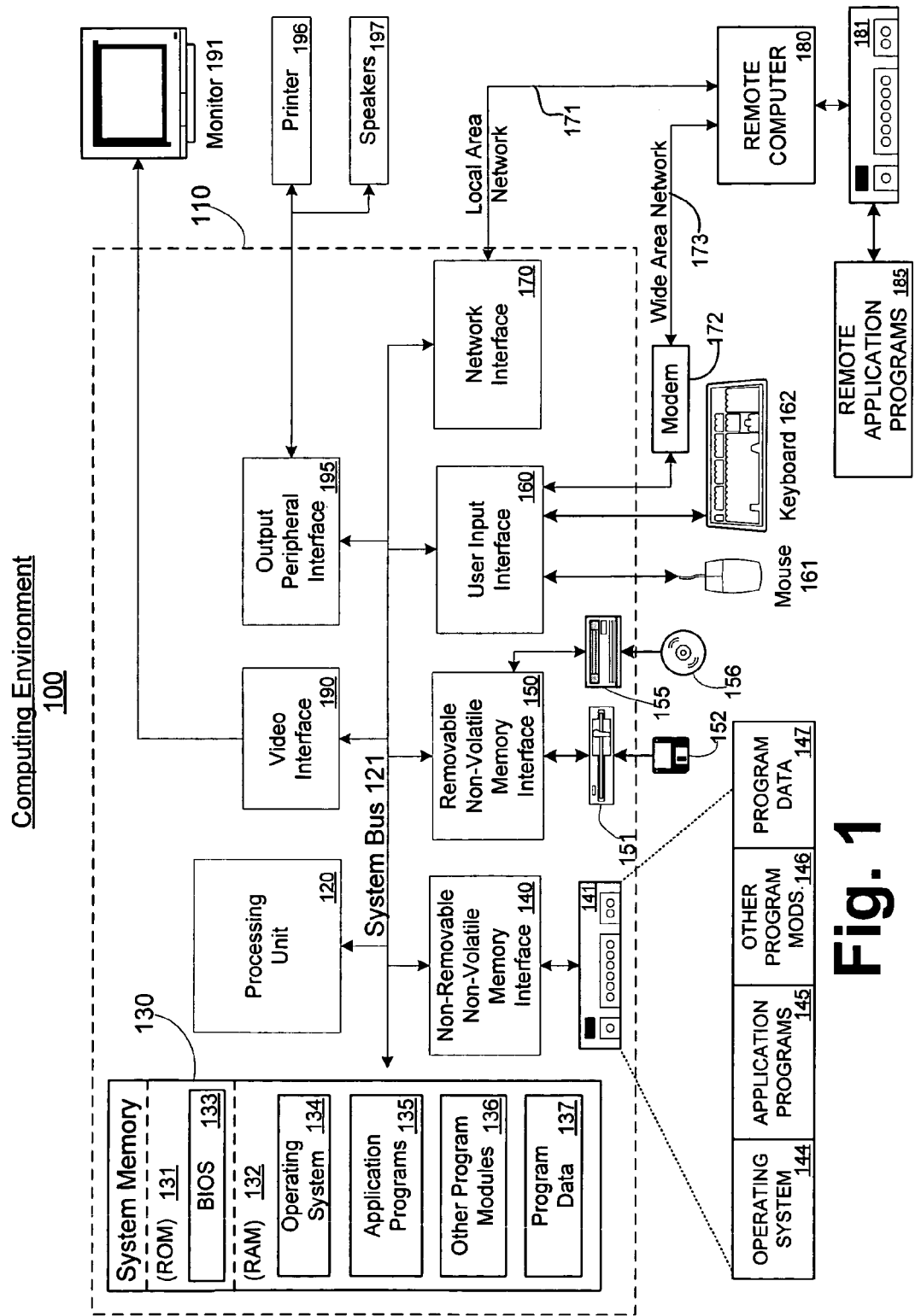
FIG. 1 is a block diagram showing an exemplary computing environment in which aspects of the invention may be implemented.

A system and method for connecting to a set of phrases joining multiple schemas is described below with reference to the aforementioned drawings. Those skilled in the art will readily appreciate that the description given herein with respect to those drawings is for explanatory purposes only and is not intended in any way to limit the scope of the invention to the specific embodiments shown. Throughout the description, like reference numerals are employed to refer to like elements in the respective figures.

Exemplary Computing Environment

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

System and Method of the Present Invention

A flowchart for a method for connecting to a set of phrases joining multiple schemas in accordance with the present invention is shown in FIG. 2. At step 210, a search engine or Internet portal receives from an affiliated data provider schemas. The schema files may be part of provider files having multiple schemas and also including additional information about the provider such as, for example, contact information. Upon being received, the schemas may be stored in the portal's database management system. The schemas have multiple nodes that may correspond to features of a web page administered by the affiliated data provider. The schemas are preferably written in Extensible Markup Language (XML). In XML, a node may be an element or an attribute.

At step 212, the portal receives from the affiliated data provider a file of phrases. A phrase is a word or words identifying specific content corresponding to a particular node in a schema. An exemplary phrase file is shown below:

```
<template query='/expedia/hotel[city=$1]'>
    <legal value='CHI'>
        <namedBy>Chicago</namedBy>
        <namedBy>Windy City</namedBy>
        <namedBy>Cow Town</namedBy>
    </legal>
    <namedBy value='PAR'>Paris</namedBy>
    <namedBy value='SEA'>Seattle</namedBy>
    <namedBy value='TIM'>Timbuktu</namedBy>
</template>
```

At step 214, phrases are matched to synsets. For example, a portal may have synset groups "City" and "Band" with synsets as shown below:

CITY: {Chicago, Windy City} {Paris, City of Light} {Seattle}

BAND: {Chicago} {Paris} {Timbuktu}

Note that Chicago and Paris are present in both the "City" synset group and the "Band" synset group because Chicago and Paris are both names of cities and names of musical artists.

When the portal matches the phrase "Chicago" from the exemplary phrase file to a synset, it is ambiguous whether the phrase should be matched to the phrase "Chicago" in the city synset group or the in the band synset group. However, when the portal matches the phrase "Windy City" from the exemplary phrase file to a synset, it is clear that phrase matches to the city synset group because the phrase windy city does not appear in the band synset group. After the portal matches the phrase "Windy City" to the city synset group, the portal may also match the phrase "Chicago" to the city synset group because the phrases "Chicago" and "Windy City" identify the same content. Such a match may be referred to as within synset resolution.

It is also unclear whether the phrase "Paris" in the exemplary schema should be matched to the city synset group or the band synset group. However, the phrase "Paris" corresponds to the same template as the phrases "Chicago" and "Windy City" which are matched to the city synset group. Thus, the phrase "Paris" may also be matched to the city synset group. Such a match may be referred to as cross synset resolution.

As should be appreciated, the phrase "Seattle" in the exemplary schema is matched to the city synset group. Like the phrase "Windy City", the phrase "Seattle" appears only in the city synset group and causes the other phrases appearing in both synset groups to be matched to the city synset group.

Finally, the phrase "Timbuktu" in the exemplary schema appears only in the band synset group. However, because the majority of the phrases corresponding to the node are matched with the city synset group, the phrase "Timbuktu" is matched to a newly established synset in the city synset group.

A flowchart of a method for joining multiple schemas in accordance with the present invention is shown in FIG. 3. Generally, joining information from multiple providers improves the efficiency of search engines to retrieve information in response to a query at query time. Information providers submit phrases to enable search engines to match queries to provider data. Search engines match phrases to synsets and use synsets to connect related information to efficiently retrieve information from multiple providers at query time. Information providers are not required to explicitly map their information to a specific form as in existing information retrieval methods.

Figure 4A:
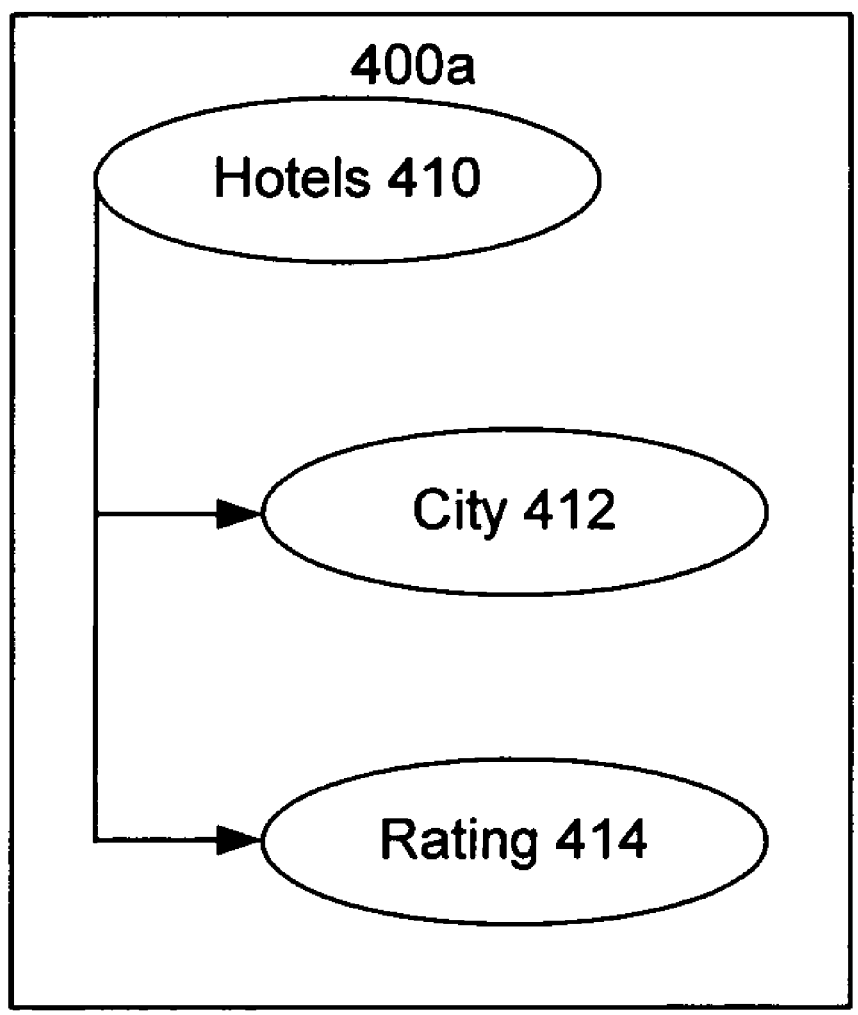
FIGS. 4a,b are diagrams of exemplary schemas in accordance with an aspect of the present invention.
Figure 4B:
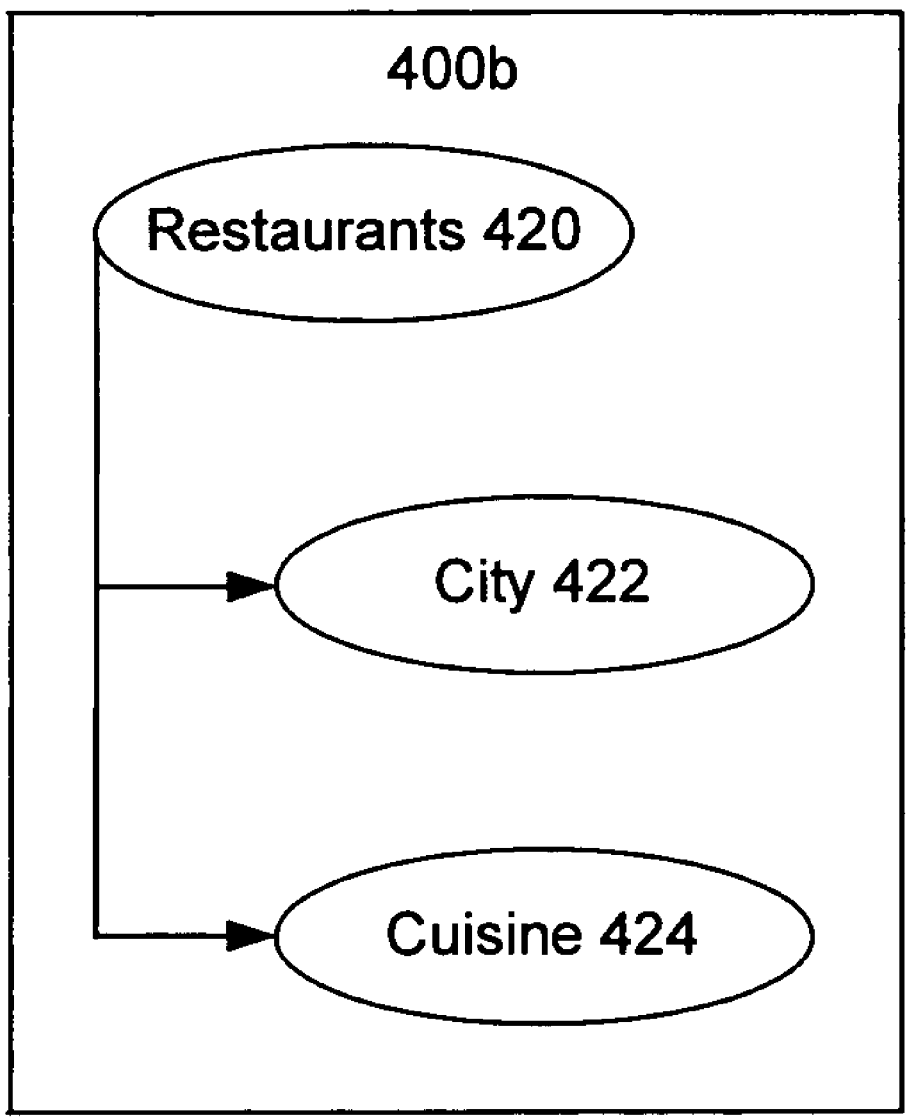

As shown in FIG. 3, at step 312, a first schema from a first affiliated data provider is received by the portal. At step 314, a second schema from a second affiliated data provider is received by the portal. An exemplary schema node diagram of the first schema is shown in FIG. 4*a* and an exemplary schema node diagram of the second schema is shown in FIG. 4*b*. Schema node diagram 400*a* of FIG. 4*a* corresponds to an exemplary "hotel" schema. As shown, node 410 corresponds to the "hotel" element, node 412 corresponds to the "city" sub-element, and node 414 corresponds to the "rating" sub-element. Schema node diagram 400*b* of FIG. 4*b* corresponds to an exemplary "restaurant" schema. As shown, node 420 corresponds to the "restaurant" element, node 422 corresponds to the "city" sub-element, and node 424 corresponds to the "cuisine" sub-element.

"Hotel" schema 400*a* of FIG. 4*a* may be a schema from a provider of data corresponding to travel planning such as, for example, Expedia®. "Restaurant" schema 400*b* of FIG. 4*b* may be a schema from a provider of data corresponding to restaurants such as, for example, Zagat's®.

Figure 5:
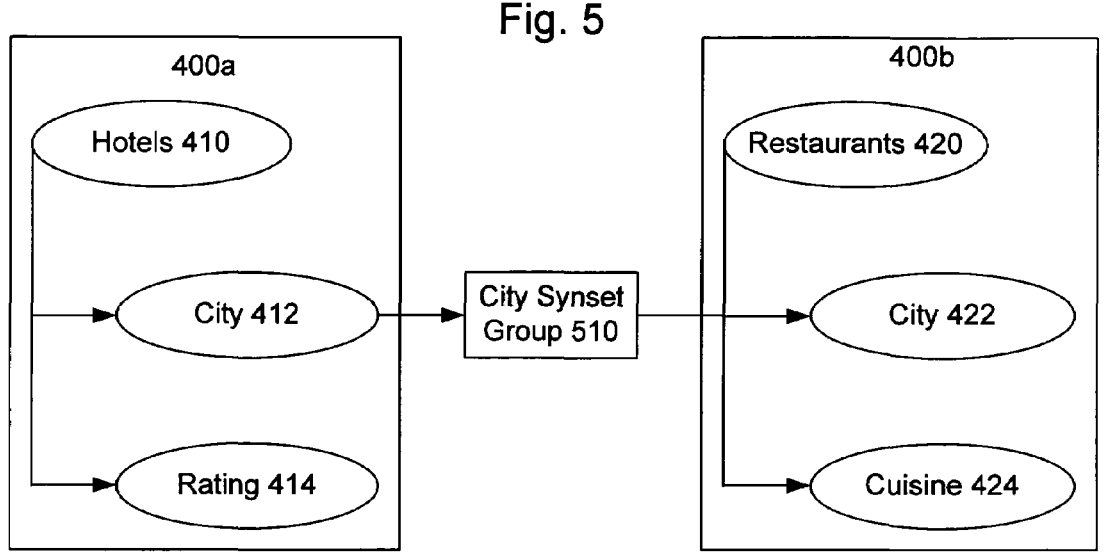
FIG. 5 is an exemplary diagram of joined schemas in accordance with an aspect of the present invention.

At step 314, at query time, a node in the first schema is joined to a node in the second schema. An exemplary diagram of joined nodes is shown in FIG. 5. As shown, "city" node 412 of "hotel" schema 400*a* and "city" node 422 of "restaurant" schema 400b are joined by "city" synset 510 found in the city synset group.

In XML schemas, nodes may be joined by associating the XPaths corresponding to the nodes. For example, "City" node 412 of FIG. 4a and "city" node 422 of FIG. 4b may be joined using the following XPaths, with "$'s" representing placeholders for a particular synset:

```
/hotel[city=$1]
/restaurant[city=$1]
```

Possible connections are described at the schema level, but actual connections happen at the individual synset level and are not associated with groups. For example, XPaths may be used to join as shown below, with "$'s" representing placeholders for a particular synset:

```
/flight[origin=$1 and destination=$2]
/yellowpages[category='Limousine' and city=$1]
/rentalcar[pickup=$2]
```

As shown above, the flight origin city is joined with the yellow page city for the "Limousine" category and the flight destination city is joined with the rental car pickup city. In the above example, flight origin cities are distinguished from flight destination cities.

As should be appreciated, there may be certain cities for which there is no data corresponding to flights, yellow pages, or rental cars. For example, there may be data for flights originating in Timbuktu, but there may not be data for yellow pages in Timbuktu. In response to a query, "Flights from Timbuktu", a portal will retrieve data corresponding to flights from Timbuktu. However, because there is no data corresponding to yellow pages in Timbuktu, no such data will be retrieved.

All nodes joined to a synset may be accessed in response to a query by simply matching a word in the query to the synset. Thus, synsets enable data from multiple providers to be accessed quickly and efficiently.

While the present invention has been described in connection with the preferred embodiments of the various FIGS., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

We claim:

1. A computer-readable medium having computer-executable instructions for performing steps comprising:
   receiving a first phrase and a second phrase both referring to identical content;
   matching the first phrase to a first matching phrase, the first matching phrase being within a first set;
   connecting the first phrase to the first set;
   determining that the first phrase does not match any of one or more phrases within a second set;
   differentiating the first phrase from the second set;
   matching the second phrase to a second matching phrase and a third matching phrase, the second matching phrase being within the first set, the third matching phrase being within a second set;
   connecting the second phrase to the first set based on a determination the second phrase refers to the identical content as the first phrase and the first phrase has been connected to the first set; and
   differentiating the second phrase from the second set based on a determination the second phrase refers to the identical content as the first phrase and the first phrase has been differentiated from the second set.

2. The computer-readable medium of claim 1, wherein the step of receiving a first phrase and a second phrase both referring to identical content comprises receiving from an affiliated data provider the first phrase and the second phrase both referring to identical content.

3. The computer-readable medium of claim 1, wherein the step of connecting the first phrase to the first set comprises connecting the first phrase to the first set which identifies content across multiple schemas.

* * * * *